United States Patent
Marr et al.

(10) Patent No.: US 9,465,652 B1
(45) Date of Patent: *Oct. 11, 2016

(54) HARDWARE-BASED MECHANISMS FOR UPDATING COMPUTER SYSTEMS

(71) Applicant: Amazon Technologies, Inc., Seattle, WA (US)

(72) Inventors: Michael David Marr, Monroe, WA (US); Nachiketh Rao Potlapally, Arlington, VA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,497

(22) Filed: Nov. 2, 2015

Related U.S. Application Data

(63) Continuation of application No. 13/693,946, filed on Dec. 4, 2012, now Pat. No. 9,176,752.

(51) Int. Cl.
*G06F 9/24* (2006.01)
*G06F 15/177* (2006.01)
*G06F 9/48* (2006.01)
*G06F 9/44* (2006.01)
*H04L 9/08* (2006.01)
*G06F 9/445* (2006.01)

(52) U.S. Cl.
CPC .......... *G06F 9/4812* (2013.01); *G06F 9/4411* (2013.01); *G06F 9/4418* (2013.01); *H04L 9/0877* (2013.01); *G06F 8/65* (2013.01); *G06F 8/665* (2013.01)

(58) Field of Classification Search
CPC .................................. G06F 8/65; G06F 8/665
USPC .................................................. 713/1, 2, 100
See application file for complete search history.

(56) References Cited

U.S. PATENT DOCUMENTS

| 5,754,798 A | 5/1998 | Uehara et al. |
| 8,015,563 B2 | 9/2011 | Araujo, Jr. et al. |
| 9,176,752 B1 | 11/2015 | Marr et al. |

OTHER PUBLICATIONS

U.S. Appl. No. 13/693,946 , "Non-Final Office Action", mailed Dec. 26, 2014, 13 pages.
U.S. Appl. No. 13/693,946 , "Notice of Allowance", mailed Jul. 15, 2015, 5 pages.

*Primary Examiner* — Michael J Brown
(74) *Attorney, Agent, or Firm* — Kilpatrick Townsend & Stockton LLP

(57) ABSTRACT

Techniques for using hardware-based mechanisms for updating computing resources are described herein. At a time after receiving a code update request, one or more hardware-supported system management capabilities of processors within a computing system are invoked at least to interrupt execution of currently running instructions. While the system management capabilities are active and instruction execution is suspended, programmatic routines are updated. After the updates are complete, instruction execution is resumed.

20 Claims, 6 Drawing Sheets

HARDWARE-BASED MECHANISMS FOR UPDATING COMPUTER SYSTEMS

CROSS-REFERENCE TO RELATED APPLICATIONS

This application is a Continuation of U.S. patent application Ser. No. 13/693,946, filed Dec. 4, 2012, issued to U.S. Pat. No. 9,176,752 on Nov. 3, 2015, entitled "HARDWARE-BASED MECHANISMS FOR UPDATING COMPUTER SYSTEMS," which is incorporated herein by reference in its entirety.

BACKGROUND

Modern computing applications place an increasing importance on system reliability, stability and availability. In many applications, especially those involving distributed computing environments wherein a large plurality of customer devices may independently use shared computing resources, system outages can be burdensome to computing resource operators or customers reliant on such systems. Additionally, it may be difficult for a computing resource operator to ascertain the tasks and/or availability requirements for a widely disparate and/or independent customer base. However, as complexity and/or computing power increases over time, so does the incidence of events requiring updates to the computing resources. Such updates may include patching of security flaws, software bug fixes and the like. When such resources and associated software are shared amongst a plurality of simultaneously connecting customers via hypervisors or other types of virtualization software layers, interruption of the resources to install such updates may be undesirable or otherwise difficult to coordinate without significantly impacting customer experience.

BRIEF DESCRIPTION OF THE DRAWINGS

Various embodiments in accordance with the present disclosure will be described with reference to the drawings, in which.

DETAILED DESCRIPTION

Figure 1:
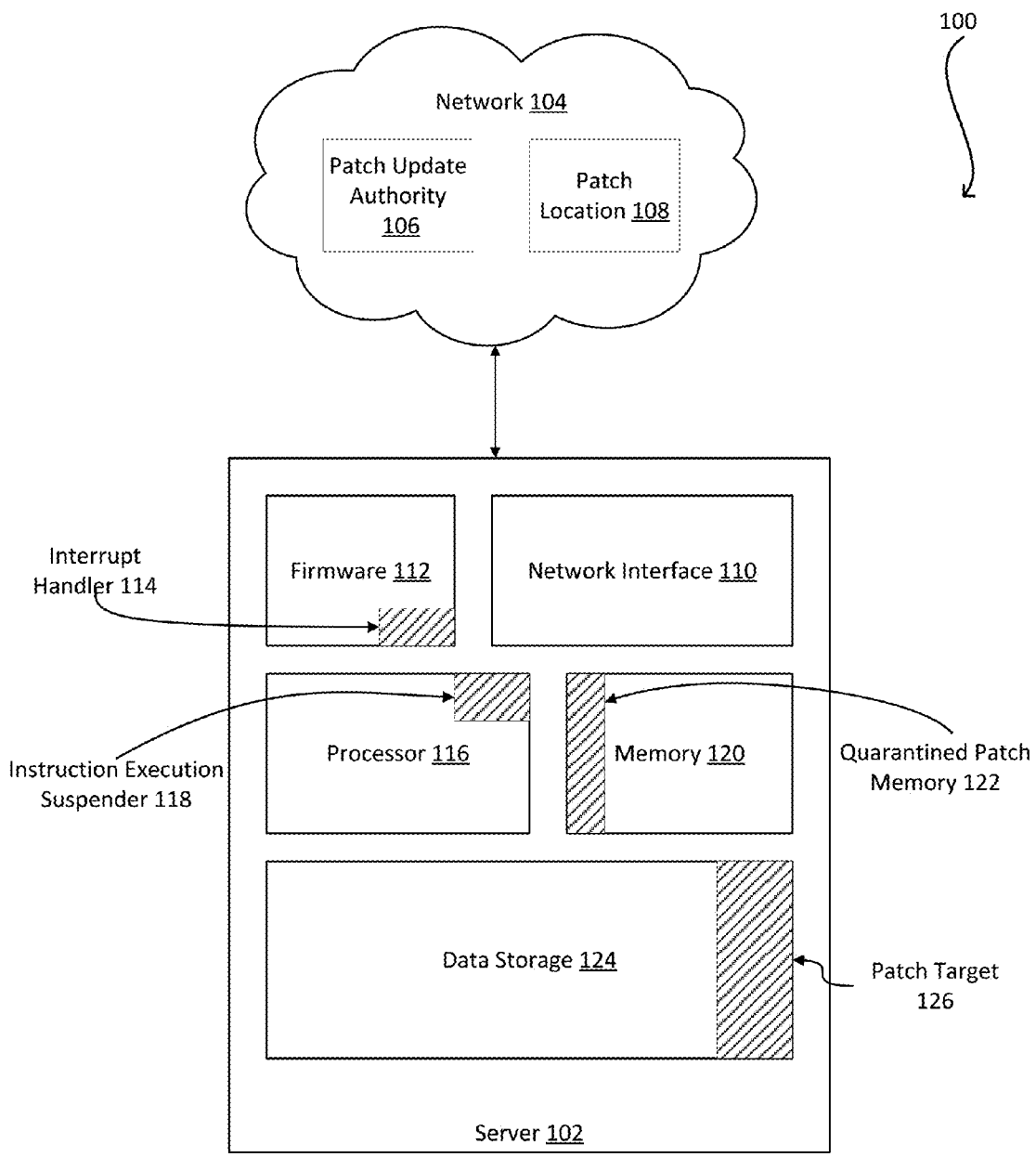
FIG. 1 illustrates an example environment in which servers and other computing resources may be updated in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems and processes for updating computing system firmware, microcode or executable code operating thereon. In particular, techniques are disclosed for utilizing hardware capabilities to facilitate operational updates of software platforms (such as operating systems, hypervisors or microcode) while being simultaneously shared with a plurality of entities connecting therewith. For example, a server upon which a virtualization scheme is implemented (e.g., using a hypervisor) may require updates to the hypervisor software or other configuration state. Since the hypervisor itself is providing a service abstraction layer for virtual machines (VM), it can be challenging to update the hypervisor while VMs are active. Updates to the server software or firmware may be facilitated by placing one or more processors into a hardware-supported management mode, such as the SMM supported by Intel Architecture (IA) processors, which among other functions provides a mechanism to suspend execution of instructions thereon. While instruction execution is suspended, critical or other components of the server may be safely updated, such as virtualization software (e.g., hypervisor or other "service domain" abstractions), processor microcode, system firmware or other management services or configuration state. The update may be acquired from a location outside of the server being updated, such as from a remote network location. The software patch may, in some embodiments, be verified for integrity and/or authenticated using various cryptographic methods, such as methods known to those of ordinary skill in the art. Upon the successful completion of the update, the previously suspended execution of instructions upon the processor(s) can be resumed, in some embodiments using a hardware function. Various sub-operations associated with the update (such as retrieval and/or temporary storage of the update code, temporary storage of the state of the processor immediately prior to suspension of instruction execution, and the like) may, in some embodiments, take advantage of an isolated area of the memory of the server accessible only during the update operation, such as system management random access memory (SMRAM). The entire process may be orchestrated by disparate processes and/or components, or, in some embodiments, may be performed and/or facilitated using a specific component adapted for such purposes, such as by using an interrupt handler implemented in system firmware provided by the Basic Input/Output System (BIOS) or Unified Extensible Firmware Interface (UEFI).

FIG. 1 illustrates an environment 100 for updating systems, such as servers, and associated code running thereon in accordance with at least one embodiment. One or more servers 102 connect to one or more networks 104 and/or entities associated therewith, such as other servers also connected to the network, either directly or indirectly. The network may, for example, be a local network, a public network such as the Internet, a wide area network, a wireless and/or mobile network, a distributed computing system with a plurality of network nodes and/or the like. The aforementioned entities may include any device that is capable of connecting with the server via a network, including at least servers, laptops, mobile devices such as smartphones or tablets, distributed computing systems and components thereof (including abstracted components such as virtual machine (VM) instances) and/or other types of computing devices and/or components. In some embodiments, one or more of such entities may be a patch update authority 106 configured to request a patch located somewhere on the network 108 to be applied to the server 102. The patch may be located on the same or different entity requesting the application thereof. In at least one embodiment, the patch update authority 106 is a device that operates, at least in part, according to instructions input by an administrator of the server 102, a larger distributed computing system to which the server belongs and/or both. The patch update authority 106 may be configured to manage patches on behalf of one or more servers (including the server 102). The patch update authority 106 may itself be updated, for example, through interaction with a human operator who may be an administrator that has authority to approve updates (e.g., new firmware images or software patches). The patch update authority 106 for a distributed computing system may be a definitive authority of approved and/or preferred patches. Upon being updated, the patch update authority may operate so that the updates are installed where appropriate using any suitable roll-out strategy, such as by pushing or pulling patches.

In some embodiments, a server 102 receives, through a network interface 110, a request from the patch update authority 106 to apply a patch. The request may be received in various ways in accordance with various embodiments. For example, in some embodiments, the server 102 implements an update agent service that is configured to interact with the patch update authority 106. The update agent service may obtain patches in various ways. In some embodiments, the update agent service receives patches that are pushed from the patch update authority 106. In other embodiments, the update agent service polls the patch update authority 106 for updated patches, such as by requesting the latest patch version identifier from the patch update authority 106. It should be noted that other ways of updating the server 102 are also considered as being within the scope of the present disclosure. As one illustrative example, the update service may not be a centralized service, but may be implemented using a BitTorrent or other protocol that enables peer-to-peer sharing of computer system updates. In this example, each server of a group of servers (e.g., including the server 102) is configured to vend bits to neighbor servers.

Returning to the embodiment illustrated in FIG. 1, requests from the patch update authority 106 may be received, intercepted, processed and/or detected by the server 102 using an application provided by a firmware 112 associated with the server 102 that is provided by the BIOS or UEFI. The firmware may include, or may be adapted to provide the server 102 functionality to handle such requests, such as by way of an interrupt handler 114. In some embodiments, an interrupt, such as a System Management Interrupt (SMI) supported by IA processors, is directed to one or more processors 116 of the server, whereupon the processor uses in-built functionality to suspend the execution of one or more instruction pipelines 118 by that processor, such as SMM as supported by IA processors. For example, an IA processor may receive an SMI that is issued from the patch update authority through the network interface 110, whereupon the processor performs internal synchronization (as defined on microcode associated with the processor and containing one or more routines associated with system management) to suspend all processor threads, thereby placing the processor in SMM. The SMI may originate, for example, from a control plane computer subsystem (often simply referred to as a "control plane") of a larger distributed computing system in which the server is integrated (or at least in operative communication). The SMI may be invoked in several ways, including by a data write to programmed input/output port 0xB2, via the expiration of a periodic timer associated with the SMI, from or through any number of system buses and/or peripherals (such as through submission of a specially coded packet to a network interface of the server), via events generated or monitored by dongles (e.g., those connected via a Universal Serial Bus (USB)), and the like. As may be contemplated, the SMI may be generated upon demand (e.g., of an administrator and/or user of the server), or periodically, such as by polling for the existence of updates to the code operating therein.

In some embodiments, upon entering SMM, the processor is then configured to execute the code associated with the interrupt handler (e.g., SMI handler) of the firmware 112. The code associated with the interrupt handler may include, but is not limited to, authentication routines (such as cryptographic verification), various routines associated with forming and storing a "snapshot" state of the processor just prior to entering SMM, routines to retrieve and/or invoke update code stored remotely or in local memory, routines to directly modify and/or overwrite data storage locations, whether logical or physical, containing the code to be updated, and the like. In embodiments where SMM is utilized, as SMM provides an uninterruptable (e.g., all other processor interrupts are disabled) execution environment that is at the highest level of code execution privilege (e.g., even higher than that of a hypervisor with direct hardware access, even when such hypervisor is running in root mode) and with access to all regions of the memory 120, provisions for ensuring isolation and integrity of the execution environment while in SMM take on increased importance. To this end, the memory may include an isolated section 122 that is only accessible to the processor while in SMM, such as System Management Random Access Memory (SMRAM). The routines and code associated with the interrupt handler, including the handler itself, may be verified, moved, copied, executed and/or cached solely within or from, for example, SMRAM. Additionally, just prior to or in the process of entering SMM, a state corresponding to that of the entire processor may be generated and stored within SMRAM so as to both protect the state from external tampering or corruption, as well as to provide for a seamless resumption of normal operation after SMM is exited. It may be appreciated that such an execution environment allows for any number of measures and routines that ensure the verifiable, safe application of patches to an operational software base. For example, the SMI handler code may include routines to securely obtain and authenticate the update code. In some embodiments, the update code may be obtained from a specific, secure location on a locally connected network, the location being hardcoded into the associated routine(s) within the SMI handler code and firewalled or otherwise restricted from accepting connections from a predefined subset of requesting locations that include the implementing server. In alternate embodiments, the update code may be provided by a patch update authority, e.g., as a part of the initial patch request and/or as an argument to the SMI handler. In some embodiments, the update code may be digitally signed using a strong private cryptographic key, and the root public key for verifying the digitally signed update code may be hardcoded into the SMI handler code. It is contemplated that other processor architectures supporting similar system management modes and thread quiescence routines may use the processes and techniques described herein.

Upon obtaining the code patch and bootstrapping the update process as described above, any appropriate update mechanism may thereafter be used. For example, the SMI handler itself may implement the application of the update code by directly writing the update code to the memory address range and/or target locations 126 upon the server's data storage 124 as specified by the update code itself. Alternatively or in addition, the SMI handler may invoke specific update routines or hooks within the virtual machine monitor (e.g., hypervisor, sometimes referred to as a virtual machine manager) by, for example, providing the update code to the hypervisor and calling the hypervisor's update routines to apply the patch. In such routines, it may be appreciated that the SMI handler may, prior to calling the hypervisor's update functions, verify the cryptographic hashes of the update functions to ensure their integrity by comparing them with reference hash values, such as may be supplied with the update code itself. In some embodiments, where applicable, the SMI handler may perform other operations, in addition or in the alternative, such as decrypting encrypted code. In such embodiments, the required update routines may be inherently supported by the hypervisor, or alternatively, the hypervisor may be adapted to support them. Upon successful application of the update code, the SMI handler may execute and/or issue an instruction to the processor to resume execution from the point where all the processor threads were interrupted. Such resumption may be effected by an instruction such as the RSM instruction on Intel Architectures, and may be performed such that execution of the now updated code may be resumed without a server crash, disruptive downtime, or other adverse effects. Thus, numerous technological advantages are achieved, such as the ability to update hypervisors without evicting or otherwise shutting down virtual machines or applications operating on computer hardware. Application routines may, therefore, resume without restarting, providing minimal disruption to the application routines and those dependent on the application routines.

Figure 2:
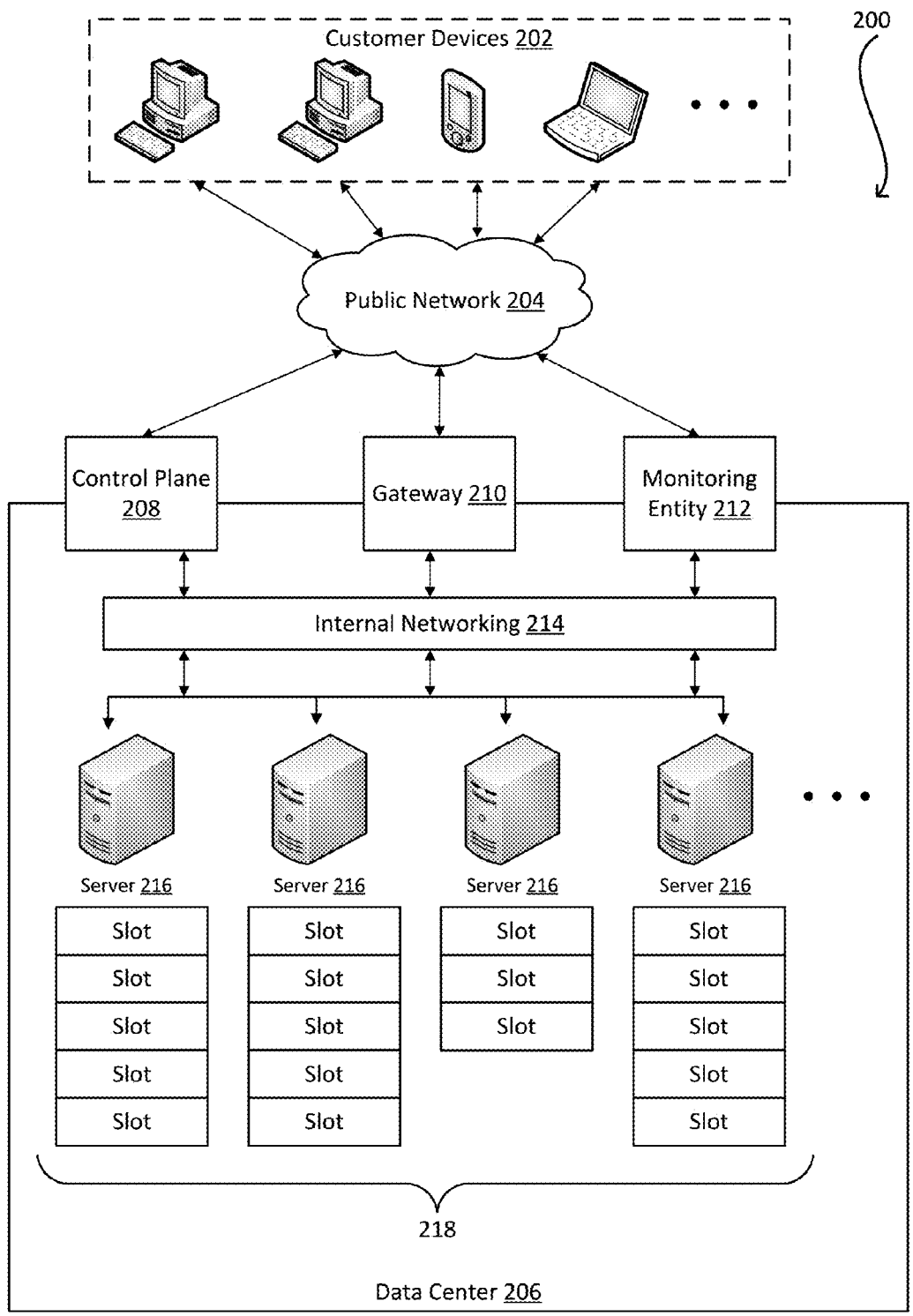
FIG. 2 illustrates an example environment in which a plurality of customers simultaneously connect to a datacenter, components of the datacenter being updated in accordance with at least one embodiment.

As may be appreciated, and as previously mentioned, the server 102 may be among a plurality of servers interconnected in a distributed computing system and/or datacenter. FIG. 2 illustrates a distributed computing and/or datacenter environment 200 in which various embodiments may be exercised. A plurality of customer devices 202 communicate via public network 204 to datacenter 206. The customer devices may include any devices capable of connecting via a public network to the data center, such as personal computers, smartphones, tablet computing devices, and the like. In an exemplary embodiment, the public network may be the Internet, although other publicly accessible networks (such as mobile and/or wireless networks) are contemplated herein. The datacenter 206 includes one or more management components, including but not limited to a control plane 208, a gateway 210 and/or a monitoring entity 212, which are collectively connected via internal networking 214 to a plurality of internal servers 216. The control plane 208 may receive requests to manipulate computing resources of the datacenter, such as provisioning resources, altering routing or performing maintenance, including updates to code running on various components of the datacenter. The gateway 210 may filter and route traffic in and out of the datacenter, such as to and/or from the servers via the internal networking. The monitoring entity may receive and report information about the status of computing resources in the data center, such as information about the internal servers.

Each internal server may be shared by multiple logical machine slots 218, each slot capable of running a guest operating system, such as would be the case in a virtualization system that abstracts the hardware of a given server into a plurality of semi-independent execution environments. Any number of the plurality of the customer devices previously described may run any number of guest operating systems in any number of slots, up to the limits of the datacenter (whether physical, logical or externally imposed), and the slots are allocated to the customers according to one or more of several operational and/or business-related criteria, such as geographical proximity, level of support and/or resources allocated to the user, server and/or slot health and/or readiness, and the like. In such a distributed environment, it may be contemplated that a large plurality of servers, and accordingly an even larger plurality of guest operating systems within the aforementioned slots, may simultaneously be affected by the emergence of a security threat and/or the necessity of a code update. Congruently, a large number of customers may be affected by the disruption of one or more of the servers and/or slots upon which a code update is necessitated.

Thus, the techniques described at least in connection with FIG. 1 may be scaled and/or adapted to provide minimally disruptive updates to computing environments associated with and/or dependent on a distributed computing system and/or datacenter. For example, each slot may have access to one or more virtual processors (VCPUs). The SMM supported by the CPU of the slot's corresponding server (e.g., a physical CPU) may be invoked, thereby pausing each VCPU so as to seamlessly update code of the server with minimal disruption. As may be contemplated, a customer device associated with the exemplary slot and/or guest operating system may issue (through the control plane, for example), an SMI, either directly or indirectly (e.g., as part of a broader "code patching" capability). Analogously, if a system administrator determines that a plurality of slots on a subset of the servers require updating, e.g., as a result of an emergent security threat, the administrator may issue (e.g., through the control plane), a request to the control plane to bootstrap the patching process to the determined subset of slots and/or servers. The examples given are not exhaustive; due to the minimally disruptive nature of the update mechanisms described herein, any subset or operational layer of the datacenter's servers, including those layers with direct hardware access and/or associated with a large plurality of connected customer devices, may be updated using the described techniques without unduly affecting the operation of the operational layers dependent thereon.

Figure 3:
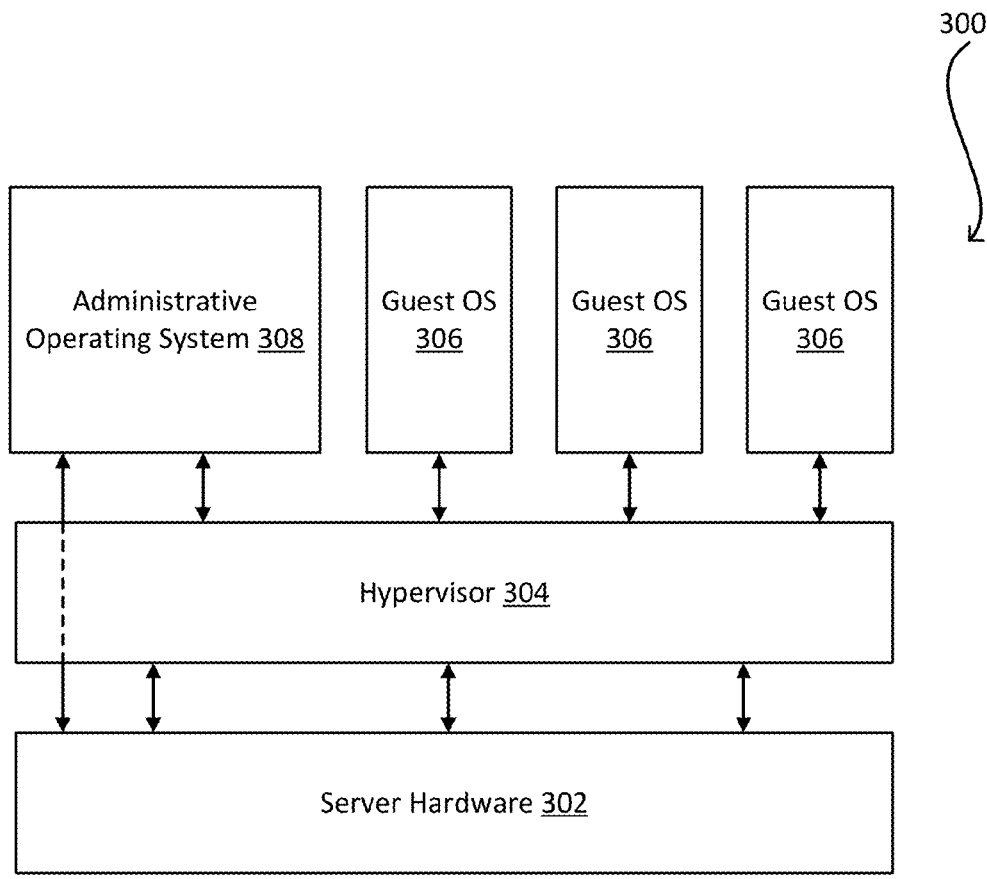
FIG. 3 illustrates an example hardware virtualization environment in which components may be updated in accordance with at least one embodiment.
Figure 4:
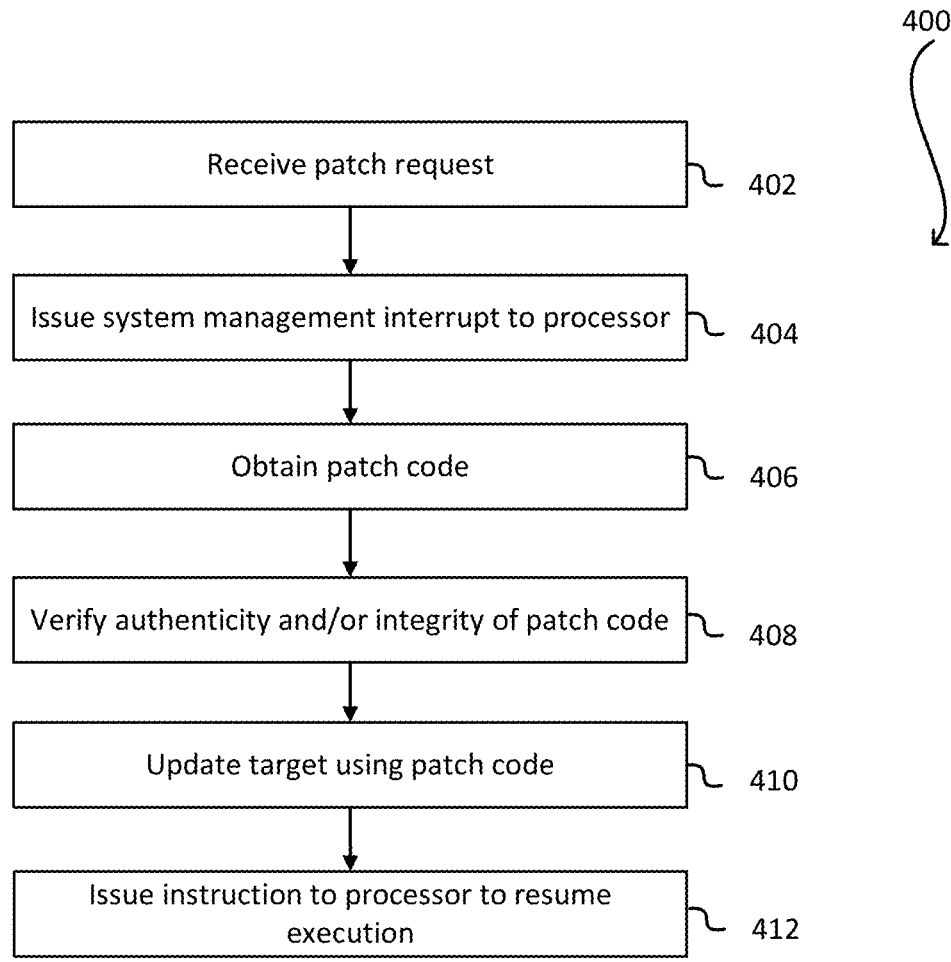
FIG. 4 illustrates an example process for updating computing systems using processor-supported capabilities in accordance with at least one embodiment.

As previously mentioned, the server hardware may be abstracted using virtualization techniques to simultaneously operate a plurality of guest operating systems. FIG. 3 illustrates an environment 300 utilizing one such technique, using a virtual machine monitor or hypervisor. The hardware 302 of the server, in some embodiments similar to that of server 102 or 216 described in connection with FIG. 1 and FIG. 2, respectively, interfaces with a virtual machine monitor or hypervisor 304 running directly on the hardware, e.g., a "bare metal" or native hypervisor. Examples of such hypervisors include Xen, Hyper-V®, and the like. Hypervisors typically run at a higher, more privileged processor state than any other software on the machine, and provide services such as memory management and processor scheduling for dependent layers and/or domains. The most privileged of such layers and/or domains resides in the service domain layer, which may include an administrative operating system 308 for configuring the operation and functionality of the hypervisor, as well as that of domains of lower privilege, such as guest domains including guest operating systems 306, which may be heterogeneous (e.g., running different operating systems than each other). The service domain may have direct access to the hardware resources of the server 302 by way of the hypervisor, while the user domains may not. As may be appreciated, and as mentioned in connection with FIGS. 1 and 2, updates to the hypervisor may affect some or all of the subservient domains. Similarly, a security threat shared amongst multiple virtualization layers may apply to some or all of the guest operating systems, administrative operating systems, and/or the hypervisor. Thus, an entity connected to the server hardware, such as the control plane 208 described in connection with FIG. 2, may bootstrap the update techniques described in connection with FIGS. 1 and 2 on or across all affected domains. For example, the control plane may cause an SMI to be issued or otherwise interrupt instruction execution on all VCPUs associated with a given server or plurality of servers, e.g., those associated with guest operating systems operating thereon, prior to updating the hypervisor(s) upon which those operating systems rely, and upon completing a patch to the hypervisor, the administrative operating system, and/or the guest operating system(s), resume instruction execution upon all processors (virtual or otherwise) upon which instruction execution was suspended. Although techniques for patching various aspects of a hypervisor-based virtualization scheme is illustratively described herein, the update techniques, the update mechanisms described are also applicable to code running within or upon other types and subtypes of virtualization, such as hardware virtualization, software virtualization, hardware-assisted virtualization (such as virtualization techniques utilizing Intel® VT-x, VT-i and/or AMD® AMD-V implementations), full virtualization, paravirtualization, partial virtualization, and any variants and/or subtypes thereof. As may be contemplated, the necessity of interrupting execution upon some or all VCPUs running on a given server may, in some embodiments, depend at least in part on the type of virtualization used, and/or the particular implementations thereof FIG. 4 illustrates an example process 400 for updating code operating on computing systems in accordance with at least one embodiment. Some or all of process 400 (or any other processes described herein or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, one or more components of server 102 as described in connection with FIG. 1 and/or datacenter 206 as described in connection with FIG. 2 may perform process 400.

An entity associated with targeted server(s) and/or abstractions thereof receives a request 402 to update (patch) code currently running thereon. The request may be received 402, for example, from an update agent service, such as described above in connection with FIG. 1. The receiving entity may be a component of the server itself or an entity external to the server, such as the control plane 208 described in connection with FIG. 2. The receiving entity issues an SMI or similar operational interrupt to the processor 404, such as by one or more of the techniques described in at least FIGS. 1 and 2, thereby suspending operation of running threads and/or instructions and, in some embodiments, placing the processor in SMM. The patch code associated with the request is obtained 406, such as over a network using techniques described in at least FIG. 1, and in some embodiments using SMI handler code that resides in firmware of the target server, also as described in connection with FIG. 1. The integrity and/or authenticity of the patch code is verified 408, such as by performing a cryptographic operation as described in connection with FIG. 1. The patch code is then applied to the associated targeted code 410 by, for example, directly updating and/or overwriting a memory address range or storage offset, or by invoking updating functionality built into a hypervisor of the server, such as described in connection with at least FIG. 1. Upon successfully completing the update routine, an instruction to resume execution of the suspended threads and/or instructions is issued to the processor 412, in some embodiments while still within SMM and/or using the SMI handler, as described in connection with FIG. 1.

Figure 5:
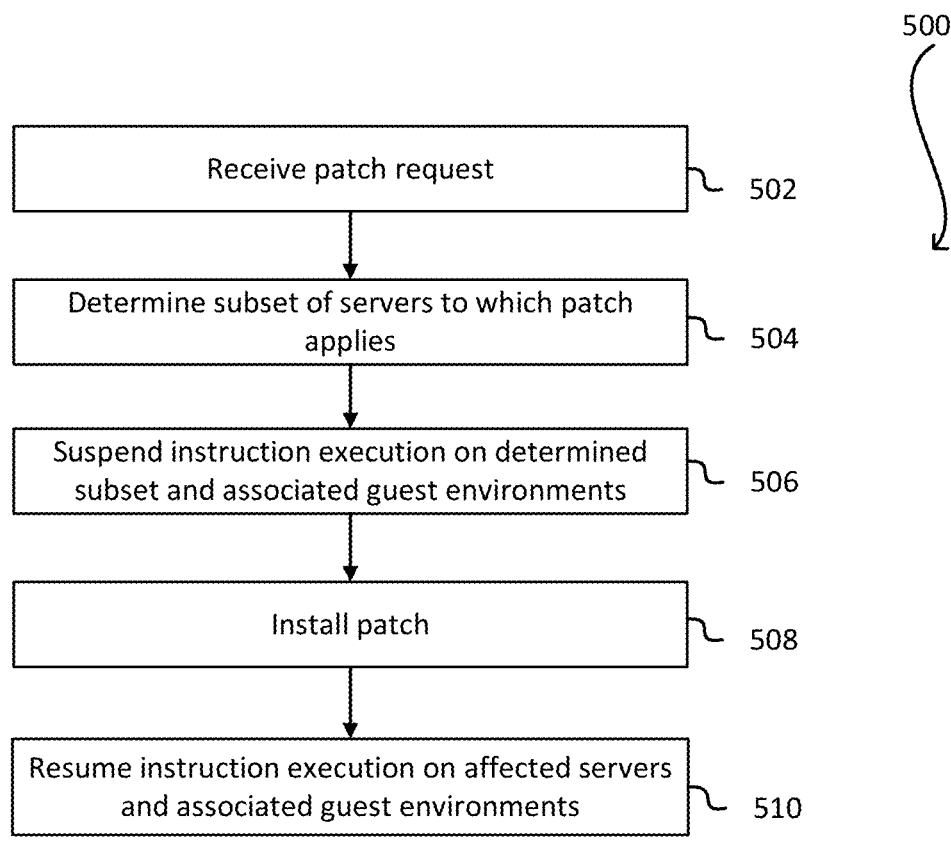
FIG. 5 illustrates an example process for updating computing resources shared by a plurality of customers in accordance with at least one embodiment.

FIG. 5 illustrates an example process 500 for updating systems, servers and/or abstractions thereof within distributed and/or collective computing environments. A patch request is received 502, such as by the control plane 208 described in connection with FIG. 2. The receiving entity determines, based, in some embodiments, on the nature of the patch and/or one or more operational parameters as described in connection with FIG. 2, the subset of servers and/or abstractions thereof to which the patch applies. Upon making the determination, the receiving entity issues instruction(s) to suspend execution of instructions and/or threads on processors associated with the determined subset 506, including, in some embodiments, all associated VCPUs, as described in connection with FIGS. 1-3. In some embodiments, as previously described, the instructions may be SMIs to the affected servers and/or abstractions (e.g., logical and/or bare metal machine instances). The patch is thereafter installed on the determined subset 508, using, in some embodiments, some or all of the techniques described in connection with FIGS. 1-3, and/or some or all of process 400. Upon successful installation of the update patch, execution of instructions and/or threads on all processors and/or VCPUs upon which such execution was previously suspended is resumed 510, for example, by issuing one or more RSM instruction as described in connection with FIGS. 1-3.

As with all processes described herein, numerous variations of the processes 400, 500 are within the scope of the present disclosure. For example, in some embodiments, the patch code is encrypted. Accordingly, variations of the present disclosure may include decrypting patch code prior to installation. Decryption may be performed by any suitable device, such as a processor of a device for which the patch code is applied. Such a processor may decrypt the patch while in SMM. Decryption may be performed using any suitable decryption algorithm according to a method by which the patch code was encrypted.

In other examples, an SMI handler, in some embodiments, uses functions present in a Hypervisor to apply a patch to the hypervisor with minimal disruption. Such patching functions may be functions that are pre-configured in the hypervisor, by an operator of a fleet of hardware devices that includes a device on which the hypervisor operates (e.g. a distributed computing resource (cloud) provider), as statically compiled code, or dynamically loadable hypervisor modules. In such embodiments, reference cryptographic hash values of the hypervisor patching functions may be passed along in an authenticated and encrypted patch. Since the operator has information indicating which version of the hypervisor is running on the machine to be patched, the operator can provide the reference hash values corresponding to the trusted patching function code present in a corresponding version of the hypervisor. Upon receipt of the patch, the SMI handler may authenticate the patch and, if authentication is successful, extract the reference hash values, compute the cryptographic hash of the hypervisor patching functions, and compare the computed hash values with the reference hash values (extracted from the patch). Matching hash values may indicate the hypervisor functions have not been tampered with, and can be used as intended when they were originally configured by the operator provider. The SMI handler may then transfer program execution (still in SMM mode) to the hypervisor patching functions to apply the patch. The Hypervisor functions may take the patch (authenticated by the SMI handler) as input, and proceed to apply it to the hypervisor code.

As other examples, various other strategies for patching are also considered as being within the scope of the present disclosure. For instance, the above techniques may be used to patch (e.g., "Dom0") operating systems (OSs), use the hypervisor to patch the Dom0 OS, and/or use the Dom0 OS to patch the hypervisor. Generally, the techniques described and suggested herein also apply to patching any trusted computing base (TCB), which can include both the hypervisor and the hosting domain OS. Generally, the TCB may be a set of components (hardware, firmware, and/or software) that are determined to be critical to the security of a computer system. In an embodiment, in order for an offload to a TCB (i.e. non-SMI handler code) to be secure, a corresponding SMI handler may be configured to load the executable patching functions on behalf of the TCB, or otherwise also validate the loader functionality in the TCB. This may be performed so as to prevent any TCB loading functionality from tampering with the executable entry points as it brings them into memory for execution in the processor. That is, the tampering with the TCB may not be in the patching functions but in the part of the TCB that prepares the patching functions for execution by the CPU (e.g., reads pages from persistent storage, initializes code or data sections, fixes up addresses, sets execution permissions, and the like.) Alternatively, the TCB could guarantee (e.g., by an appropriately configured electronic message to the SMI handler) that the patching functions are fully loaded and pinned in memory first, and then the SMI handler may then validate the integrity of the in-memory image of the patching functions and directly use the in-memory image of the patching functions.

Figure 6:
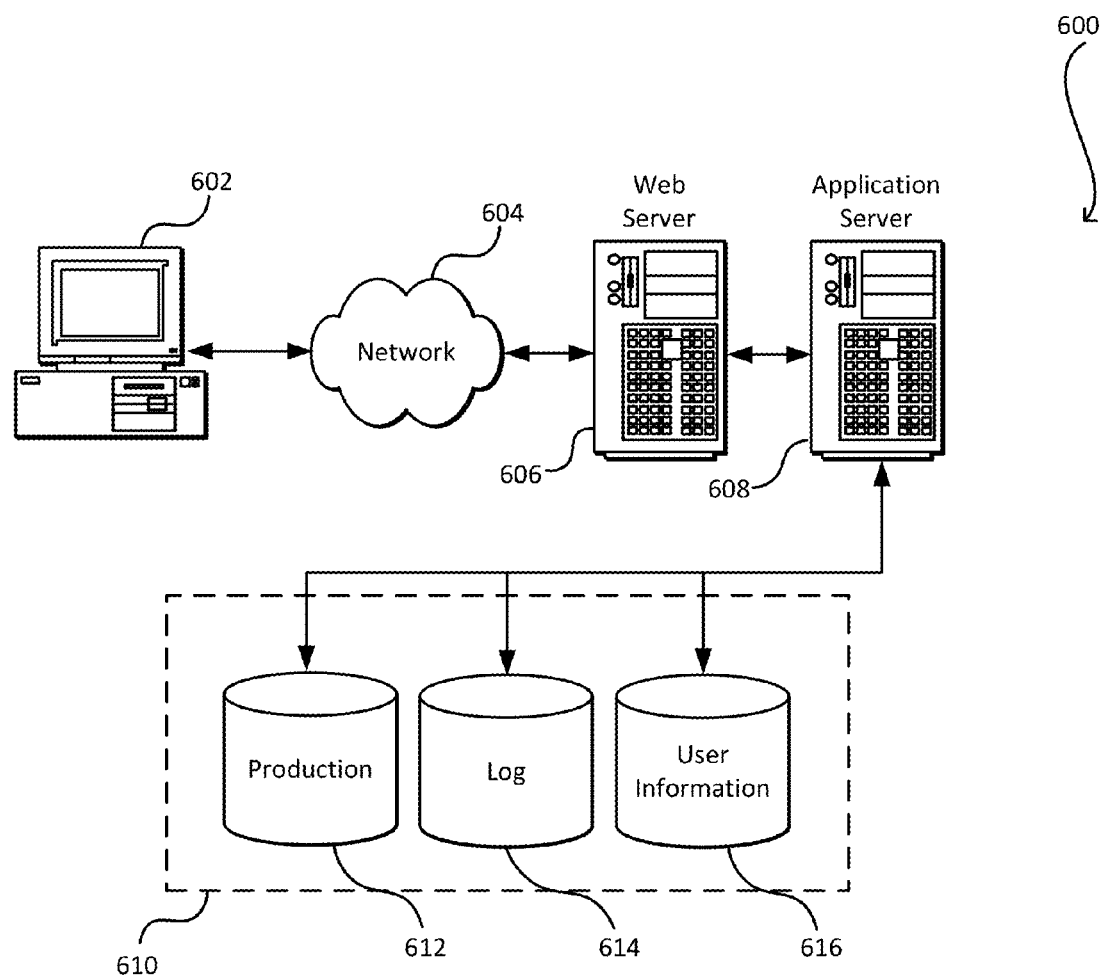
FIG. 6 illustrates an environment in which various embodiments can be implemented.

FIG. 6 illustrates aspects of an example environment 600 for implementing aspects in accordance with various embodiments. As will be appreciated, although a Web-based environment is used for purposes of explanation, different environments may be used, as appropriate, to implement various embodiments. The environment includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, at a computer system, a system management interrupt;
   based in part on receiving the system management interrupt, temporarily suspending execution of a subset of executable instructions associated with operation of a trusted computing base;
   receiving one or more updates to at least a portion of the trusted computing base;
   authenticating an integrity of at least one update of the one or more updates by at least performing a cryptographic operation on the at least one update with a cryptographic key;
   updating the portion of the trusted computing base using the authenticated at least one update; and
   resuming execution of the subset of the executable instructions.

2. The computer-implemented method of claim 1, wherein the trusted computing base comprises a virtual processor and a service domain layer operating on the virtual processor.

3. The computer-implemented method of claim 2, wherein temporarily suspending execution of the subset of executable instructions comprises interrupting instruction execution on the virtual processor.

4. The computer-implemented method of claim 1, wherein the trusted computing base comprises an administrative operating system.

5. The computer-implemented method of claim 4, wherein the trusted computing base further comprises at least one guest operating system operating on the administrative operating system.

6. The computer-implemented method of claim 4, wherein the trusted computing base further comprises at least one user domain operating on the administrative operating system.

7. The computer-implemented method of claim 1, wherein the system management interrupt is handled by a system management interrupt handler that is resident in fully virtual hardware associated with the trusted computing base.

8. The computer-implemented method of claim 7, wherein the system management interrupt handler authenticates the integrity of the received update.

9. A non-transitory computer-readable storage medium having stored thereon computer-executable instructions that, when executed by a processor, cause the processor to perform operations comprising:
   receiving a code update request;
   invoking one or more system-management capabilities of a computer system at least to interrupt execution of at least a subset of executable instructions associated with one or more programmatic routines;
   updating the one or more programmatic routines while execution of the associated subset of instructions is interrupted; and
   resuming execution of the subset of executable programs.

10. The non-transitory computer-readable storage medium of claim 9, wherein invoking one or more system management capabilities of the computer system further comprises interrupting instruction execution on a virtual processor.

11. The non-transitory computer-readable storage medium of claim 9, wherein invoking one or more system management capabilities of the computer system further comprises interrupting operation of an administrative operating system and at least one user domain operating on the administrative operating system.

12. The non-transitory computer-readable storage medium of claim 9, wherein the programmatic routine is updated by application of a software patch.

13. The non-transitory computer-readable storage medium of claim 12, wherein authenticity of the software patch is authenticated at a time prior to the application of the software patch.

14. The non-transitory computer-readable storage medium of claim 9, wherein resuming execution of the subset of executable programs further comprises resuming execution of one or more application routines without restarting the application routines.

15. The non-transitory computer-readable storage medium of claim 9, wherein:

interrupting the subset of executable instructions further comprises issuing an instruction to suspend one or more processing threads; and resuming execution of the subset of instructions further comprises issuing an instruction to resume execution of the suspended threads.

16. A computer system, comprising:

one or more processors; and memory, including instructions executable by the one or more processors to cause the computer system to at least:

receive requests to update one or more programmatic routines in active operation upon the computer system; and process the received requests by at least:

pausing the active operation of the one or more programmatic routines by at least entering a privileged management mode supported by the computer system;

updating the one or more programmatic routines in accordance with the received request; and at a time after the one or more programmatic routines have been updated, resuming the active operation of the one or more programmatic routines.

17. The computer system of claim 16, wherein the privileged management mode is a system management mode of a virtual machine.

18. The computer system of claim 17, wherein the privileged management mode is only accessible to the virtual machine at a time after entering the privileged management mode.

19. The computer system of claim 16, wherein the one or more processors comprise one or more virtual processors, and wherein the privileged management mode is only accessible to the one or more virtual processors at a time after entering the privileged management mode.

20. The computer system of claim 16, wherein the one or more programmatic routines comprise an administrative operating system operating at least one user domains.

\* \* \* \* \*